United States Patent Office 2,754,239
Patented July 10, 1956

2,754,239
CEMENT FOR ADHESION OF ISOBUTYLENE-DIOLEFIN POLYMERS TO FIBERS

Samuel B. Robison, Roselle, N. J., assignor to Esso Research and Engineering Company, a corporation of Delaware No Drawing. Application October 1, 1952,
Serial No. 312,645

18 Claims. (Cl. 154—140)

This invention broadly pertains to a novel method for improving the adhesion of synthetic rubber polymers to fibers, and more particularly, it pertains to a new technique for obtaining greater adhesion between isoolefin-diolefin copolymers and fiber cords such as tire cords and to the bonded compositions obtained thereby.

In the production of rubbery articles containing cords, fibers or cloth, and prepared from either natural or synthetic sources, it is very essential to obtain a strong, adhesive bond between the rubbery material and the cord or fabric. This problem has long been recognized in the fabrication of such articles as pneumatic tires and the like. Heretofore, a number of methods were developed and used for improving the adhesion of rubbery materials to fibers. These methods include the use of such ingredients for the purpose of improving adhesion as casein, rosin esters, and even mixtures of resorcinol and formaldehyde in aqueous solution. However, in every case, these materials were aqueous adhesives and were applied to the fiber or cord by passing the fabric to be treated for increased adhesion through an aqueous bath of the mixture of adhesive, and then removing excess liquid followed by drying of the treated cord or fabric. Operating in this manner, it was absolutely necessary that the adhesive material be added to an aqueous latex mixture prior to its application to the cord or fabric. These adhesive materials were thus quite satisfactory for use with rubbery maerials where a latex form is normally and conveniently used, but were obviously totally useless for use with non-aqueous rubbery cements. Such materials include natural rubber, butadiene-styrene copolymers, and neoprene synthetic rubber.

Thus, these adhesives cannot be used to improve the adhesion of the isoolefin-diolefin synthetic copolymers. These copolymers are never and, in fact, cannot be prepared in latex form. Thus, the use of these copolymers requires the use of a non-aqueous system in which the presently known adhesive materials cannot be used.

It has now been discovered that an outstanding adhesion between the isoolefin-diolefin copolymers and cords and fibers, such as rayon and cotton fibers, and the like, can be obtained by the use of limited quantities of resorcinol and paraformaldehyde in an isoolefin-diolefin cement. Preferred limits of concentration are from 1 to 20 parts of resorcinol and 1 to 20 parts of paraformaldehyde based on the total amount of cement compound (SBR Sept. 30, 1952). Both of the materials are specific and are very critical for obtaining the superior results produced by this invention.

When using mixtures of resorcinol and aqueous formaldehyde in aqueous formulations, a minor concentration of a strongly alkaline substance is necessary in the latex mixture to act as a catalyst for the reaction of the resorcinol and the formaldehyde. However, since the times and temperatures required for the complete cure for the isoolefin-diolefin copolymers are much greater than those for the latex type of rubbers, no catalyst whatever is required in the mixtures of this invention.

The process of improving the adhesion by the use of this invention may be employed with any of the well-known isoolefin-diolefin synthetic copolymers, such as are, for instance, described in U. S. Patents 2,356,128 and 2,356,129. These include the copolymers formed by the low-temperature, Friedel-Crafts polymerization of isoolefins having from 4 to 14 carbon atoms, with diolefins having 4 to 14 carbon atoms, and preferably, the copolymers of isobutylene with conjugated diolefins such as isoprene, piperylene, butadiene, and dimethyl butadiene, having 4 to 6 carbon atoms.

The formulations used may be varied widely as to curatives, fillers, resins, and the like, and such variations are well known in the art.

For making up the cement itself, the solvent and the cement itself which are employed may be selected to fit the particular purpose for which it is being prepared. The solvent may be benzene, toluene or higher aromatics, solvent naphtha, hexane, heptane or higher aliphatics or mixtures thereof with or without minor concentrations of non-solvents such as ketones or alcohols. Since paraformaldehyde is present as a dispersion in these solvents or solvent mixtures, dispersing agents may be utilized to improve the quality and permanence of the paraformaldehyde and other insoluble solids suspension. The cords, fabric, or fibers which are to be treated may be so treated by many techniques such as dipping, use of a transfer roll, or dough spreader.

The adhesion values shown in the data were obtained by dipping 12 to 18 inch lengths of the specified tire cord in cement and drying at room temperature for 2 hours or more or shorter times at elevated temperatures (80–100° C.). A ½ inch length of treated cord is vulcanized into the center of a 1½ x ½ x ¼ inch rubber matrix which is reinforced with a light cotton duck on the two long sides from which the cord does not protrude. The technique is similar to the H test reported by Lyons, Conrad and Nelson, Rubber Chemistry and Technology, 268–280, vol. XX, 1947. The force required to break the bond between the ½ inch length of cord imbedded in the rubber block is measured by means of a Scott tensile tester.

The isobutylene-isoprene rubber matrix from which the cord lengths were pulled was prepared in the following formulation:

| Ingredient: | Parts by weight |
|---|---|
| Copolymer [1] | 100 |
| Channel carbon black | 50 |
| Stearic acid | 0.5 |
| Zinc oxide | 5.0 |
| Sulfur | 2.0 |
| Tellurac (tellurium diethyl dithiocarbamate) | 1.0 |
| Petroleum softener oil | 15 |

[1] 70 Mooney copolymer, prepared by low-temperature, Friedel-Crafts polymerization of a mixture of 97.5% isobutylene and 2.5% isoprene.

The invention will be described in more detail by the following examples although it is not intended to limit the invention in any way thereto. All concentrations are expressed by weight unless otherwise indicated.

EXAMPLE 1.—EFFECT OF CONCENTRATION

To portions of a carbon black masterbatch, various concentrations of resorcinol and paraformaldehyde were added on a laboratory mill. This Masterbatch A contained the following ingredients:

Masterbatch A

| Ingredient: | Parts by weight |
|---|---|
| Copolymer [1] | 100 |
| Channel carbon black | 50 |
| Zinc oxide | 5.0 |
| Stearic acid | 0.5 |
| Sulfur | 2.0 |
| Tellurac (tellurium diethyl dithiocarbamate) | 1.0 |

[1] Same isobutylene-isoprene copolymer as that used in the matrix recipe above.

After addition of the resorcinol and paraformaldehyde as shown below, a cement was prepared by shaking overnight 14 g. of compound in 150 cc. of benzene. The test specimens were cured for 25 minutes at 320° F. and the results are shown in Table I. These data indicate in every case a two-fold improvement in adhesion strength with the use of 3.3 to 20.0 parts of the two cement additives.

*Table I*

EFFECT OF CEMENT ADDITIVES CONCENTRATION

| Sample No | 1 | 2 | 3 | 4 | 5 |
|---|---|---|---|---|---|
| Masterbatch A (g.) | 237.7 | 237.7 | 237.7 | 237.7 | 237.7 |
| Resorcinol (g.) | 5.0 | 10.0 | 20.0 | 30.0 | |
| Resorcinol (pts.) | 3.3 | 6.7 | 13.3 | 20.0 | |
| Paraformaldehyde (g.) | 5.0 | 10.0 | 20.0 | 30.0 | |
| Paraformaldehyde (pts.) | 3.3 | 6.7 | 13.3 | 20.0 | |

ADHESION TO CONTINUOUS FILAMENT RAYON CORD—LBS. @ 20"/MIN. JAW SEPARATION RATE

| | | | | | |
|---|---|---|---|---|---|
| Room Temperature | 11.2 | 13.6 | 11.6 | 7.6 | 6.9 |
| 250° F | 6.6 | 7.8 | 7.8 | | 4.0 |

EXAMPLE 2.—EFFECT OF CONCENTRATION

A series of experiments was carried out using a 50 parts carbon black and 5 parts zinc oxide copolymer masterbatch containing 100 parts of copolymer as in Example 1. After addition of the resorcinol, the mill was heated above the melting point of resorcinol to aid its dispersion. The remaining ingredients, paraformaldehyde and curatives, were added on a cold mill. The results of this series of experiments show that Sample 7 containing 10 parts of each additive (equal parts) appears to have a slight advantage.

*TABLE II*

RESORCINOL AND PARAFORMALDEHYDE CONCENTRATION STUDY

| Sample No | 6 | 7 | 8 |
|---|---|---|---|
| Masterbatch (g.) | 155 | 155 | 155 |
| Resorcinol (pts.) | 5 | 10 | 15 |
| Paraformaldehyde (pts.) | 5 | 10 | 15 |
| Sulfur (pts.) | 2 | 2 | 2 |
| Tellurac (pts.) (Tellurium diethyl dithiocarbamate) | 1 | 1 | 1 |
| Cement Solids—14 g./150 cc. of hexane. | | | |

ADHESION TO RAYON—LBS. AT 20"/MIN. JAW SEPARATION RATE

| | | | |
|---|---|---|---|
| Room Temperature | 13.9 | 14.3 | 13.5 |

EXAMPLE 3.—EFFECT OF RATIO OF PARAFORMALDEHYDE TO RESORCINOL

During preparation of the adhesives from formaldehyde and resorcinol, the resin becomes harder and infusible as the mole ratio of formaldehyde to resorcinol increases. The effect on adhesion to rayon continuous filament tire cord is shown in Table III. The compounds were prepared using Masterbatch A as shown above. Sample 11 has the best high temperature adhesion. At the low resorcinol concentrations, for example, 3.3 pts., a ratio of paraformaldehyde to resorcinol greater than 1:1 is desirable.

*Table III*

EFFECT OF PARAFORMALDEHYDE TO RESORCINOL RATIO

| Sample No. | 9 | 10 | 11 | 12 | 13 | 14 | 15 | 16 | 17 |
|---|---|---|---|---|---|---|---|---|---|
| Masterbatch A (g.) | 237.7 | 237.7 | 237.7 | 237.7 | 237.7 | 237.7 | 237.7 | 237.7 | 237.7 |
| Resorcinol (g.) | 5.0 | 5.0 | 5.0 | 10.0 | 10.0 | 10.0 | 20.0 | 20.0 | 20.0 |
| Resorcinol (pts.) | 3.3 | 3.3 | 3.3 | 6.7 | 6.7 | 6.7 | 13.3 | 13.3 | 13.3 |
| Paraformaldehyde (g.) | 2.5 | 5.0 | 10.0 | 5.0 | 10.0 | 20.0 | 10.0 | 20.0 | 40.0 |
| Paraformaldehyde (pts.) | 1.7 | 3.3 | 6.7 | 3.3 | 6.7 | 13.3 | 6.7 | 13.3 | 26.6 |

POUNDS ADHESION @ 20"/MIN. JAW SEPARATION RATE

| | | | | | | | | | |
|---|---|---|---|---|---|---|---|---|---|
| Room Temperature | 11.0 | 11.2 | 12.4 | 11.5 | 13.6 | 12.4 | 12.2 | 11.6 | 11.2 |
| 250° F | | 7-8 | 8.7 | 7.1 | 7.8 | 7.7 | | 7.8 | 7-8 |

EXAMPLE 4.—SPECIFICITY TO RESORCINOL

A masterbatch similar in composition to Masterbatch A was utilized. To this was added 10 parts, based on the polymer, of paraformaldehyde. This product was divided into 168 g. batches to which were added on laboratory mill the various chemically related hydroxy benzenes shown in Table IV. The concentrations are adjusted on the basis of molecular weights to provide the same concentration of benzene rings in each experiment.

The cements were prepared by adding 20 g. of compound to 192 cc. of n-hexane and 8 cc. of isopropyl alcohol. Test specimens were cured for 25 minutes at 320° F. Outstanding in effectiveness is Sample 21. This Sample 21 contains 10 parts each of resorcinol and paraformaldehyde.

*Table IV*

ALTERNATE HYDROXY BENZENES WITH PARAFORMALDEHYDE

| Sample No. | 18 | 19 | 20 | 21 | 22 | 23 | 24 |
|---|---|---|---|---|---|---|---|
| Masterbatch (g.) | 168 | 168 | 168 | 168 | 168 | 168 | 168. |
| Reagent (Ident.) | Phenol | p-cresol | catechol | resorcinol | hydroquinone | pyrogallol | phloroglucinol. |
| Reagent (g.) | 8.55 | 10.2 | 10.0 | 10.0 | 10.0 | 11.46 | 11.46 |

ADHESION TO RAYON TIRE CORD AT ROOM TEMPERATURE

| | | | | | | | |
|---|---|---|---|---|---|---|---|
| Pounds | 7.8 | 7.8 | 7.9 | 15.2 | 7.7 | 8.2 | 8.9 |

EXAMPLE 5.—SPECIFICITY TO PARAFORMALDEHYDE

Two different polymers of formaldehyde were tried, the linear polymer, paraformaldehyde $(CH_2O)_x$ ($x$=about 16) and, the cyclic polymer, trioxane or $\alpha$-trioxymethylene $(CH_2O)_3$. To a black copolymer compound similar to Masterbatch A, were added 10 parts of resorcinol and 10 parts of trioxane. A cement was prepared from 20 grams of this compound and 200 cc. of mixed solvents (192 cc. hexane+8 cc. isopropyl alcohol). Rayon test specimens cured for 25 minutes at 320° F. had an adhesion strength of 8 pounds at room temperature. Furfural was also investigated since it will react with resorcinol in a manner analogous to formaldehyde. To a black compound similar to Masterbatch A, were added 10 parts of resorcinol and 30 parts of furfural. The furfural was increased since its molecular weight (96.08) is greater than that of the formaldehyde (30.03).

This was tested in a manner similar to the trioxane compound and yielded an adhesion strength of 7.0 pounds.

Thus, both trioxane and furfural, when used with resorcinol, give adhesion values substantially lower than does paraformaldehyde.

EXAMPLE 6.—ADHESION TO COTTON TIRE CORD

Adhesion to cotton is generally more easily obtained than to rayon due to the physical nature of the cord produced from this staple fiber. This novel technique of stiffening the sheath of rubber surrounding the cord is also effective for cotton as shown in Table V. These cements were prepared from Masterbatch A. Sample 25 is the control with no additives and Samples 26 and 27 contains 6.7 parts each of resorcinol and paraformaldehyde. The test assemblies were cured for 25 min. at 320° F.

Table V
ADHESION TO COTTON TIRE CORD

| Sample No | 25 | 26 | 27 |
|---|---|---|---|
| Cement Solids, g./cc | 14 g./150 cc. benzene. | 14 g./150 cc. benzene. | 15 g./150 cc. hexane +8 cc. isopropyl alcohol. |

POUNDS ADHESION @ 20″/MIN. JAW SEPARATION RATE

| | | | |
|---|---|---|---|
| Room Temperature | 14.8 | 15.9 | 17.6–19.6. |
| 250° F | 7.6 | 8.5 | 9.0. |

EXAMPLE 7.—EFFECT OF CEMENT STORAGE

If a prolonged shelf life is required for these cements, a two part cement technique may be utilized or the resorcinol may be dissolved in the cement approximately 24 hrs. before its application to the fabric or cord. These techniques are demonstrated in the data of Tables VI and VII. The cement compound masterbatch recipe contained 100 parts of polymer, 50 parts channel black, 5 parts zinc oxide, 2 parts sulfur, 1 part tellurac (tellurium diethyl dithiocarbamate) and 0.5 part stearic acid.

The data of Table VII indicate that a somewhat greater than 1:1 weight ratio of reactants (paraformaldehyde to resorcinol) is preferred for optimum results at low resorcinol concentrations (2 parts).

Table VI
CEMENTS FOR PROLONGED SHELF LIFE (STORAGE)

| Sample No | 28 | 29 | 30 | 31 |
|---|---|---|---|---|
| Cement Masterbatch (g.) | 158.5 | 158.5 | 158.5 | 158.5 |
| Paraformaldehyde | 20 | ----- | 10 | 10 |
| Resorcinol | ----- | 20 | ----- | ----- |

Cement solids: 15 g. of each in 150 cc. mixed solvent (142.5 cc. hexane+7.5 cc. isopropyl alcohol), except Sample 31—15 g. in 142.5 cc. hexane.

| Cements prepared for cord dipping by | Blending Equal weights. | Dissolving 0.94 g. resorcinol in cement (10 pts.). | Dissolving 0.94 g. resorcinol in 7.5 cc. isopropyl—add to cement (10 pts.). |
|---|---|---|---|

ADHESION TO RAYON AT ROOM TEMPERATURE—JAW SEPARATION RATE 20″/MIN.

| | | | | |
|---|---|---|---|---|
| Fresh Compounds, lbs | 10.7 | | 14.5 | 14.4 |
| Aged 7 days, lbs | 10.4 | | --- | --- |
| Aged 11 days, lbs | ---- | | 13.1 | 13.0 |
| Aged 48 days, lbs | ---- | | 10.9 | 12.3 |

Table VII
CEMENTS FOR PROLONGED SHELF LIFE (STORAGE)

| Sample No | 32 | 33 | 34 | 35 | 36 | 37 | 38 | 39 | 40 |
|---|---|---|---|---|---|---|---|---|---|
| Copolymer | 100 | 100 | 100 | 100 | 100 | 100 | 100 | 100 | 100 |
| Stearic acid | 0.5 | 0.5 | 0.5 | 0.5 | 0.5 | 0.5 | 0.5 | 0.5 | 0.5 |
| p-dinitroso benzene [1] (curing agent) | 0.5 | 0.5 | 0.5 | 0.5 | 0.5 | 0.5 | 0.5 | 0.5 | 0.5 |
| Channel Carbon Black | 50 | 50 | 50 | 50 | 50 | 50 | 50 | 50 | 50 |
| Sulfur | 2 | 2 | 2 | 2 | 2 | 2 | 2 | 2 | 2 |
| Tellurac (tellurium diethyl dithiocarbamate) | 1 | 1 | 1 | 1 | 1 | 1 | 1 | 1 | 1 |
| Paraformaldehyde | 1 | 2 | 2 | 4 | 2 | 4 | 8 | 8 | 12 |

CEMENT PREPARATION, SOLVENT CONTAINS 95% HEXANE +5% ISOPROPYL ALCOHOL

| | | | | | | | | | |
|---|---|---|---|---|---|---|---|---|---|
| Compound (g.) | 16.5 | 16.5 | 16.5 | 16.5 | 16.5 | 16.5 | 16.5 | 16.5 | 16.5 |
| Solvent (cc.) | 151 | 151 | 152 | 152 | 152 | 154 | 154 | 157 | 160 |

Table VII.—Continued

AFTER MAKING ABOVE MIXTURES, RESORCINOL WAS DISSOLVED IN THE CEMENT

| | | | | | | | | | |
|---|---|---|---|---|---|---|---|---|---|
| Resorcinol (g.) | .104 | .103 | .206 | .203 | .411 | .406 | .397 | .794 | 1.163 |
| Resorcinol (pts.) | 1 | 1 | 2 | 2 | 4 | 4 | 4 | 8 | 12 |

ADHESION TO RAYON—20″/MIN. JAW SEPARATION RATE

| | | | | | | | | | |
|---|---|---|---|---|---|---|---|---|---|
| Lbs. @ Room Temperature | 7.8 | 7.8 | 8.7 | 10.3 | 9.0 | 11.3 | 14.1 | [2] 15+ | 14.7 |

[1] 30% active ingredient (p-dinitrosobenzene) in inert mineral filler.
[2] Value obscured by several cord failures.

EXAMPLE 8.—EFFECT OF VARIATION IN CURING RECIPES

This technique should not be restricted to the presence in the cement compound of a definite quantity or type of black or type or concentration of curative. The cements for Table VIII were prepared by dispersing 16 g. of compound, complete except for resorcinol, in 150 cc. of mixed solvent (mixture of 190 cc. hexane and 10 cc. isopropyl alcohol). Following this step, the resorcinol was dissolved in the cement and rayon tire cord treated 24 hours later. Data and results are shown in Table VIII below.

Table VIII

ADHESION TO RAYON TIRE CORD—CEMENT CURATIVES AND FILLER VARIATIONS

| Sample No. | 41 | 42 | 43 | 44 | 45 | 46 | 47 | 48 |
|---|---|---|---|---|---|---|---|---|
| Copolymer [1] | 100 | 100 | 100 | 100 | 100 | 100 | 100 | 100 |
| Channel Black [2] | | 50 | 50 | 50 | 50 | 50 | 70 | 50 |
| p-dinitrosobenzene [3] | | 0.5 | 0.5 | 0.5 | 0.5 | 0.5 | 0.5 | 0.5 |
| Stearic Acid | | 0.5 | 0.5 | 0.5 | 0.5 | 0.5 | 0.5 | 0.5 |
| Zinc Oxide | 5.0 | | 5.0 | 5.0 | 5.0 | 5.0 | 5.0 | 5.0 |
| p,p'-Dibenzoylquinone Dioxime | | | | | | | | 6 |
| p-Quinone Dioxime | | | | | | | 2 | |
| Tetrachloro quinone [4] | | | | | 1.0 | 1.0 | 6 | 6 |
| Tellurium Diethyl Dithiocarbamate | 1.0 | | | 2.0 | 2.0 | 2.0 | | |
| Sulfur | 2.0 | | | | | | | |
| Paraformaldehyde | 8.0 | 10.0 | 10.0 | 10.0 | 10.0 | 9.0 | 10.0 | 10.0 |
| Resorcinol | 8.0 | 10.0 | 10.0 | 10.0 | 10.0 | 9.0 | 10.0 | 10.0 |

RAYON TIRE CORDS DIPPED CEMENTS—ADHESION AT ROOM TEMPERATURE

| Pounds | 7.6 | 13.7 | 10.7 | 11.7 | 11.3 | 11.9 | 15.4 | 12.4 |
|---|---|---|---|---|---|---|---|---|

[1] 70 Mooney copolymer, prepared by low-temperature, Friedel-Crafts polymerization of a mixture of 97.5% isobutylene and 2.5% isoprene.
[2] MPC—Channel carbon black.
[3] 30% p-dinitrosobenzene in inert mineral filler.
[4] Oxidizing agent for non-sulfur cures.

EXAMPLE 9.—EFFECT OF VARIATION OF COPOLYMER

Likewise, this invention is not limited to use of any particular copolymer but any of the isobutylene-diolefin rubbery copolymers prepared with conjugated diolefins such as isoprene or butadiene as the diolefin. The use of several typical examples is shown below in Table IX.

Table IX

VARIATIONS IN COPOLYMER TYPE

| Sample No. | 49 | 50 | 51 |
|---|---|---|---|
| Copolymer | 50 Mooney [1] isobutylene-isoprene. | 50 Mooney [2] isobutylene-isoprene. | 81 Mooney [3] isobutylene-butadiene. |
| Channel Carbon Black | 50. | 50. | 50. |
| Stearic Acid | 0.5. | 0.5. | 0.5. |
| Zinc Oxide | 5. | 5. | 5. |
| Sulfur | 2. | 2. | 2. |
| Tetramethyl thiuram disulfide | 1.25. | 1.25. | 1.25. |
| Paraformaldehyde | 10. | 10. | 10. |
| Resorcinol | 10. | 10. | 10. |

Cement solids—16 g./150 cc. mixed solvent (190 hexane+10 isopropyl alcohol)

ADHESION TO RAYON—20″/MIN. JAW SEPARATION RATE

| Pounds | 10.2 | 12.0 | 11.6 |
|---|---|---|---|

[1] Copolymer from feed containing 1.45 wt. percent isoprene based on isobutylene.
[2] Copolymer from feed containing 2.5 wt. percent isoprene based on isobutylene.
[3] Copolymer from feed containing 70 wt. percent butadiene based on isobutylene.

What is claimed is:

1. A method for cementing fibers to isobutylene-diolefin copolymers which comprises the steps of preparing a cement comprising 100 parts by weight of isobutylene-diolefin copolymer, 50 parts of carbon black, 5 parts of zinc oxide, 0.5 part of stearic acid, 2 parts of sulfur, 1.0 part of tellurium diethyl dithiocarbamate, from 3 parts to 20 parts of resorcinol, and from 3 parts to 20 parts of paraformaldehyde using 0.5 to 2 parts of resorcinol per part of paraformaldehyde, and a volatile hydrocarbon liquid solvent for said copolymer in an amount of about 150 cc. per 15 grams of said compounded cement composition, treating said fibers with said cement, evaporating the solvent, and bonding said fibers to an isobutylene-diolefin copolymer by vulcanization.

2. A fabric treated with a volatile hydrocarbon liquid cement of an isobutylene-diolefin copolymer and having incorporated therein from 1 part to 20 parts of resorcinol and from 1 part to 20 parts of paraformaldehyde per 100 parts by weight of the copolymer.

3. A fabricated composition consisting essentially of an isobutylene-diolefin copolymer having bonded thereto a fibrous material, said bond being formed by pretreating said fibrous material with a volatile hydrocarbon liquid cement containing 100 parts by weight of an isoolefin-diolefin synthetic rubber and from 1 part to 20 parts of resorcinol, from 1 part to 20 parts of paraformaldehyde, and curatives, followed by vulcanization of the fabricated composition.

4. A method for preparing and using cement compositions for adhesion of fabric material to isoolefin-diolefin rubbery copolymers and capable of prolonged storage, which comprises the steps of preparing as one portion, a volatile hydrocarbon liquid cement containing from 1 to 20 parts of resorcinol, and preparing separately as a second portion, a volatile hydrocarbon liquid cement containing 100 parts by weight of an isoolefin-diolefin synthetic rubber dissolved therein and from 1 to 20 parts of paraformaldehyde dispersed therein as a fine powder, maintaining said portions separately until required for use, then mixing said two cement portions together, contacting said fabric material with said mixed cement, and forming an improved bond between the thus treated fabric and an isoolefin-diolefin rubbery copolymer by curing the synthetic rubber whereby the resorcinol and paraformaldehyde are resinified simultaneously.

5. A method according to that described in claim 4 in which the isoolefin-diolefin copolymer is an isobutylene-isoprene copolymer.

6. A synthetic rubber cement comprising a rubbery isoolefin-diolefin copolymer synthetic rubber, 1 to 20 parts of paraformaldehyde dispersed therein as a finely divided powder, per 100 parts by weight of copolymer, a volatile hydrocarbon liquid solvent for said copolymer and 1 to 20 parts of resorcinol, said cement being substantially free of water.

7. Composition according to claim 6 also containing vulcanizing agents.

8. A synthetic rubber cement for bonding fabric material to isobutylene-isoprene synthetic rubber, comprising about 100 parts by weight of isobutylene-isoprene synthetic rubber, about 1 to 20 parts of paraformaldehyde, 1 to 20 parts of resorcinol, having a ratio of 0.5 to 2.0 parts by weight of resorcinol per 1 part of paraformaldehyde, and a volatile hydrocarbon liquid solvent for said isobutylene-isoprene synthetic rubber in an amount corresponding to about 150 cc. of solvent per 15 grams of said rubber cement solids, said cement being substantially free of water.

9. A method for improving the adhesion of tire cords to isobutylene isoprene copolymers, which comprises the steps of preparing a volatile hydrocarbon liquid cement containing an isobutylene-isoprene synthetic rubber and not more than about 40 wt. % based on the rubber of approximately equal proportions of resorcinol and paraformaldehyde, contacting said tire cords with said cement, and forming an improved bond between the thus treated tire cords and an isoolefin-diolefin rubbery copolymer by curing the rubber, resorcinol-paraformaldehyde, and copolymer in a single curing step.

10. A method for cementing fibers to isobutylene-diolefin copolymers which comprises the steps of preparing a cement containing a major proportion of volatile hydrocarbon solvent, and a minor proportion of an isobutylene-isoprene synthetic rubber with not more than about 20 parts by weight of paraformaldehyde and resorcinol in a ratio greater than 1 to 1, per 100 parts by weight of rubber, treating said fibers with said cement, and thereafter bonding said treated fibers to an isobutylene-diolefin copolymer by vulcanization.

11. A method for improving the adhesive properties of fabric material which comprises contacting the fabric material with a cement consisting essentially of a major proportion of a volatile organic solvent and a minor proportion of an unreacted mixture of an uncured isoolefin-diolefin rubbery copolymer-containing composition, resorcinol, and paraformaldehyde; said mixture containing per 100 parts by weight of said copolymer from 1 part to 20 parts of resorcinol and from 1 part to 20 parts of paraformaldehyde.

12. Method according to claim 11 in which the solvent is selected from the group consisting of hydrocarbons, hydrocarbons mixed with ketones, hydrocarbons mixed with alcohols and mixtures thereof.

13. Method according to claim 11 in which the impregnated fabric is adhered to an isoolefin-diolefin rubbery copolymer by curing the rubbery composition whereby the resorcinol is simultaneously resinified with the paraformaldehyde, in situ, in the absence of added catalysts.

14. Method according to claim 11 in which at least 4 parts of both resorcinol and paraformaldehyde are employed.

15. Method according to claim 11 in which the isoolefin-diolefin rubbery copolymer containing composition includes per 100 parts by weight of the copolymer a minor proportion of zinc oxide, sulfur, and a vulcanization accelerator.

16. Method according to claim 11 in which the solvent consists essentially of a mixture of at least one hydrocarbon and alcohol.

17. Method according to claim 14 in which the resorcinol and paraformaldehyde are present in approximately equal proportions by weight.

18. Method according to claim 15 in which the contacted fabric is adhered to an isoolefin-diolefin rubbery copolymer by vulcanizing the rubbery copolymer containing composition at a temperature of about 320° F. for about 25 minutes whereby a resorcinol-paraformaldehyde resin is simultaneously formed.

References Cited in the file of this patent

UNITED STATES PATENTS

| | | |
|---|---|---|
| 2,128,229 | Charch et al. | Aug. 30, 1938 |
| 2,314,998 | Lessig et al. | Mar. 30, 1943 |
| 2,343,551 | Harkins | Mar. 7, 1944 |
| 2,354,426 | Briant | July 25, 1944 |
| 2,495,175 | Nagel | Jan. 17, 1950 |
| 2,499,724 | Compton | Mar. 7, 1950 |
| 2,542,048 | Nagel | Feb. 20, 1951 |
| 2,557,826 | Keaton | June 19, 1951 |
| 2,605,248 | Fish | July 29, 1952 |
| 2,639,258 | Evans et al. | May 19, 1953 |

FOREIGN PATENTS

| | | |
|---|---|---|
| 653,569 | Great Britain | of 1951 |